(12) United States Patent
Marappan et al.

(10) Patent No.: US 11,099,755 B2
(45) Date of Patent: Aug. 24, 2021

(54) MULTIPATH DEVICE PSEUDO NAME TO LOGICAL VOLUME MAPPING FOR HOST DEVICES

(71) Applicant: EMC IP Holding Company LLC, Hopkinton, MA (US)

(72) Inventors: Gopinath Marappan, Coimbatore (IN);
Kurumurthy Gokam, Bangalore (IN);
Madhu Tarikere, Bangalore (IN);
Vinay G. Rao, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 51 days.

(21) Appl. No.: 16/734,526

(22) Filed: Jan. 6, 2020

(65) Prior Publication Data

US 2021/0208804 A1     Jul. 8, 2021

(51) Int. Cl.
*G06F 13/00*     (2006.01)
*G06F 3/06*      (2006.01)
*G06F 9/54*      (2006.01)

(52) U.S. Cl.
CPC .......... *G06F 3/0635* (2013.01); *G06F 3/0604* (2013.01); *G06F 3/0655* (2013.01);
(Continued)

(58) Field of Classification Search
CPC .... G06F 3/0635; G06F 3/0604; G06F 3/0673; G06F 9/542; G06F 3/0655; G06F 9/546; G06F 3/0665
See application file for complete search history.

(56) References Cited

U.S. PATENT DOCUMENTS 6,567,397 B1    5/2003  Campana et al.
6,629,189 B1 *  9/2003  Sandstrom ............ G06F 3/0601
                                                          711/4
(Continued)

FOREIGN PATENT DOCUMENTS

CN    103677927 B    2/2017
EP      1117028 A2   7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Jing-Yih Shyu
(74) *Attorney, Agent, or Firm* — Ryan, Mason & Lewis, LLP (57) ABSTRACT

An apparatus comprises a host device comprising at least one processor coupled to memory. The host device is configured to communicate over a network with a storage system comprising a plurality of storage devices. The host device is further configured to identify a logical volume identifier corresponding to a given logical volume of the storage system and to submit a message comprising an indication of the logical volume identifier to a messaging system. The host device is further configured to obtain, from the messaging system, an indication of a pseudo name corresponding to the logical volume identifier and to assign the obtained pseudo name to a multipath device corresponding to the given logical volume, the multipath device comprising a plurality of paths between the host device and the given logical volume.

20 Claims, 6 Drawing Sheets

(52) U.S. Cl.
CPC .......... *G06F 3/0665* (2013.01); *G06F 3/0673*
(2013.01); *G06F 9/542* (2013.01); *G06F*
*9/546* (2013.01)

(56) References Cited

U.S. PATENT DOCUMENTS

| | | | |
|---|---|---|---|
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,415,591 B1 * | 8/2008 | Todd | G06F 3/0614 711/165 |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,843,789 B2 | 9/2014 | Sandstrom et al. | |
| 8,874,746 B1 | 10/2014 | Gonzalez | |
| 9,026,694 B1 | 5/2015 | Davidson et al. | |
| 9,400,611 B1 | 7/2016 | Raizen | |
| 9,594,780 B1 | 3/2017 | Esposito et al. | |
| 9,647,933 B1 | 5/2017 | Tawri et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,639 B2 | 12/2019 | Mallick et al. | |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 * | 7/2007 | Cheung | G06F 8/656 719/321 |
| 2008/0043973 A1 | 2/2008 | Lai et al. | |
| 2008/0201458 A1 | 8/2008 | Salli | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2013/0117766 A1 | 5/2013 | Bax et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2017/0351444 A1 * | 12/2017 | Candelaria | G06F 3/0665 |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2020/0110552 A1 * | 4/2020 | Kumar | G06F 16/214 |
| 2020/0348861 A1 * | 11/2020 | Marappan | G06F 3/0644 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.
VMWARE, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMWARE, Inc. "VMware VMFS Volume Management," 2009, 8 pages.
U.S. Appl. No. 15/795,653 filed in the name of Maneesh Pusalkar et al. on Oct. 27, 2017 and entitled "Storage System with Network-Wide Configurable Device Names."
U.S. Appl. No. 16/142,274 filed in the name of Sanjib Mallick et al. on Sep. 26, 2018 and entitled "Host Device with Multi-Path Layer Implementing Automatic Standby Setting for Active-Active Configuration."
U.S. Appl. No. 16/145,502 filed in the name of Vinay G. Rao et al. on Sep. 28, 2018 and entitled "Host Device with Multi-Path Layer Implementing Path Selection Based At Least In Part on Fabric Identifiers."
U.S. Appl. No. 16/155,491 filed in the name of Kundan Kumar et al. on Oct. 9, 2018 and entitled "Migrating Control of a Multi-Path Logical Device from a Current MPIO Driver to a Target MPIO Driver."
U.S. Appl. No. 16/155,429 filed in the name of Rimpesh Patel et al. on Oct. 9, 2018 and entitled "Categorizing Host IO Load Pattern and Communicating Categorization to Storage System."

* cited by examiner

MULTIPATH DEVICE PSEUDO NAME TO LOGICAL VOLUME MAPPING FOR HOST DEVICES

FIELD

The field relates generally to information processing systems, and more particularly to storage in information processing systems.

BACKGROUND

Multipath drivers often group all of the paths between a host device and a given logical volume of a storage system into a logical device, also known as a multipath device, and assign a pseudo name to the multipath device such as, e.g., deviceX. Multipath devices are utilized by the multipath drivers of a host device to distribute input-output (IO) operations across all available paths to a given logical volume.

In some storage systems, the pseudo names of the multipath devices are automatically configured by the multipath drivers of each host device. In such a storage system, the multipath drivers of each host device typically assign their own pseudo names to their multipath devices. For example, the multipath devices for the same logical volume of the storage system may be assigned different pseudo names on different host devices by their respective multipath drivers.

SUMMARY

In one embodiment, an apparatus comprises a host device comprising at least one processor coupled to memory. The host device is configured to communicate over a network with a storage system comprising a plurality of storage devices. The host device is further configured to identify a logical volume identifier corresponding to a given logical volume of the storage system and to submit a message comprising an indication of the logical volume identifier to a messaging system. The host device is further configured to obtain, from the messaging system, an indication of a pseudo name corresponding to the logical volume identifier and to assign the obtained pseudo name to a multipath device corresponding to the given logical volume, the multipath device comprising a plurality of paths between the host device and the given logical volume.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
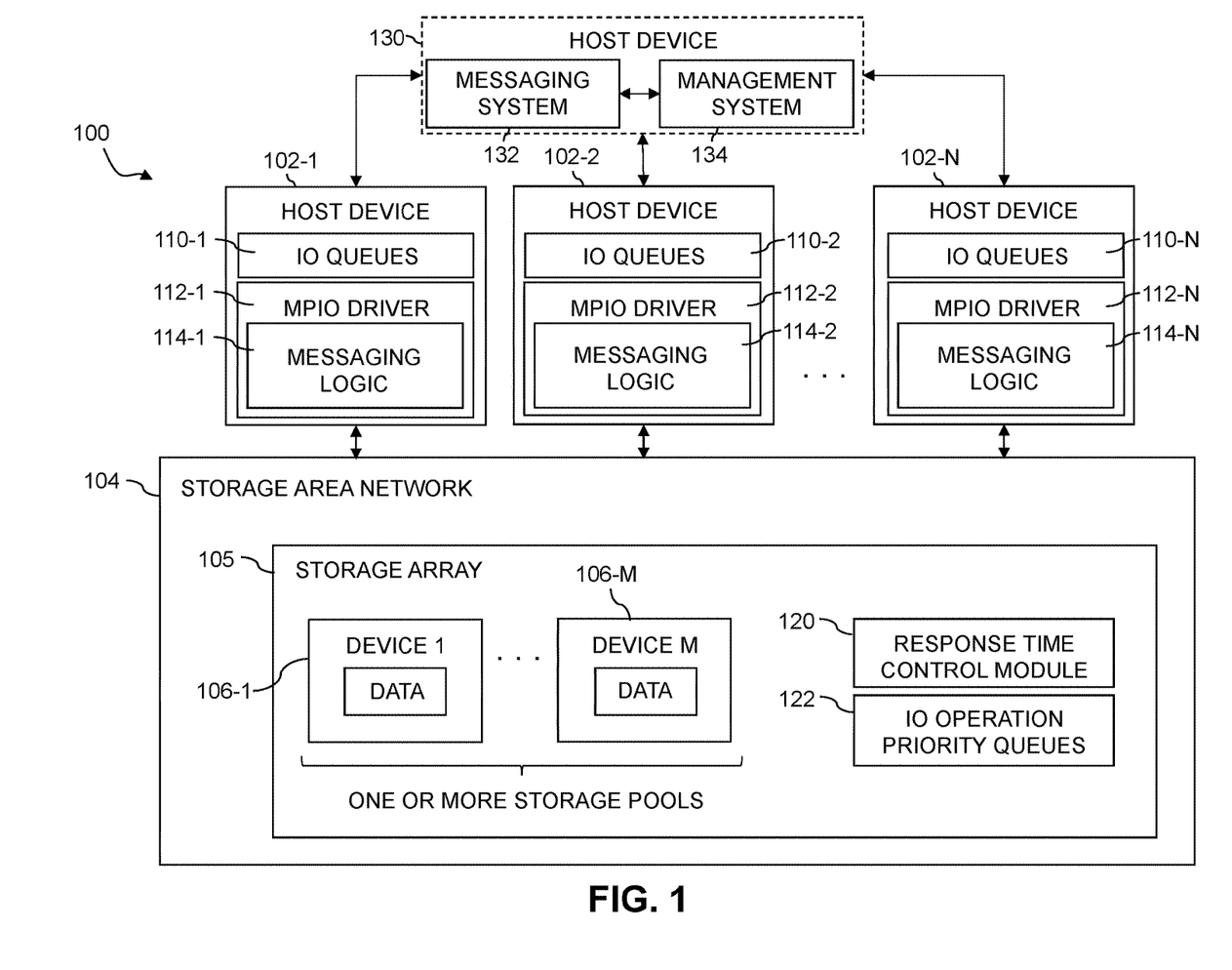
FIG. 1 is a block diagram of an information processing system configured with functionality for automatically configuring pseudo names for logical volumes across host devices in an illustrative embodiment.

FIG. 1 shows an information processing system 100 configured in accordance with an illustrative embodiment. The information processing system 100 comprises a plurality of host devices 102-1, 102-2, . . . 102-N, referred to herein collectively as host devices 102. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 is an example of what is more generally referred to herein as a "storage system." This storage system in the present embodiment is shared by the host devices 102, and is therefore also referred to herein as a "shared storage system."

In some embodiments, the host devices 102 may also communicate with a host device 130 either over the SAN 104 or over one or more other network connections. Host device 130 comprises a messaging system 132 and a management system 134.

Messaging system 132 is utilized by the host devices 102 to convey information between the host devices 102. In illustrative embodiments, messaging system 132 may comprise a subscription-based messaging system such as, e.g., a Message Queuing Telemetry Transport (MQTT) messaging system or any other subscription-based messaging system. In other embodiments any form of a messaging system that may be utilized to convey information between the host devices 102 may be used. In some embodiments, the host devices 102 may alternatively communicate directly with each other without using an intermediary messaging system 132.

Management system 134 is a centralized management console through which the host devices 102 can be monitored. For example, the host devices 102 may be configured to send pathing and other device information to the management system 134 for use in monitoring the activities of the host devices 102 in the information processing system 100.

While both the messaging system 132 and management system 134 are illustrated as being part of a host device 130, in some embodiments, messaging system 132 and management system 134 may alternatively run on separate host devices. In some embodiments, one or both of messaging system 132 and management system 134 may alternatively run on a portion of the storage array 105 itself.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical units or volumes (LUNs) configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective multipath input-output (MPIO) drivers 112-1, 112-2, . . . 112-N. The MPIO drivers 112 collectively comprise a multi-path layer of the host devices 102. The multi-path layer provides functionality for messaging logic 114-1, 114-2, . . . 114-N implemented within the MPIO drivers 112. In some embodiments the messaging logic 114 may alternatively be implemented within the respective host devices 102 separate from the MPIO drivers 112 and may be utilized by the MPIO drivers 112 to communicate with each other, e.g., via messaging system 132.

MPIO drivers typically group all paths from a host device to a logical volume into a single logical device known as a multi-path logical device. The individual block devices representing each path are known as native devices. Applications use a multi-path logical device for IO operations so that the IO operations may be distributed across all available paths. When paths fail, the MPIO driver will typically redirect the IO operations to other alive paths in the multi-path logical device.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In some embodiments, paths are added or deleted in conjunction with the addition of a new communication adaptor or the removal of an existing communication adaptor from the host device.

In these and other situations, path discovery scans may be performed by the MPIO drivers of the multi-path layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers described herein may comprise, for example, otherwise conventional MPIO drivers, such as PowerPath® drivers from Dell EMC, suitably modified in the manner disclosed herein to implement functionality for automatically configuring pseudo names for logical volumes across host devices. Other types of MPIO drivers from other driver vendors may be suitably modified to incorporate functionality for automatically configuring pseudo names for logical volumes across host devices as disclosed herein.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array

105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and messaging logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
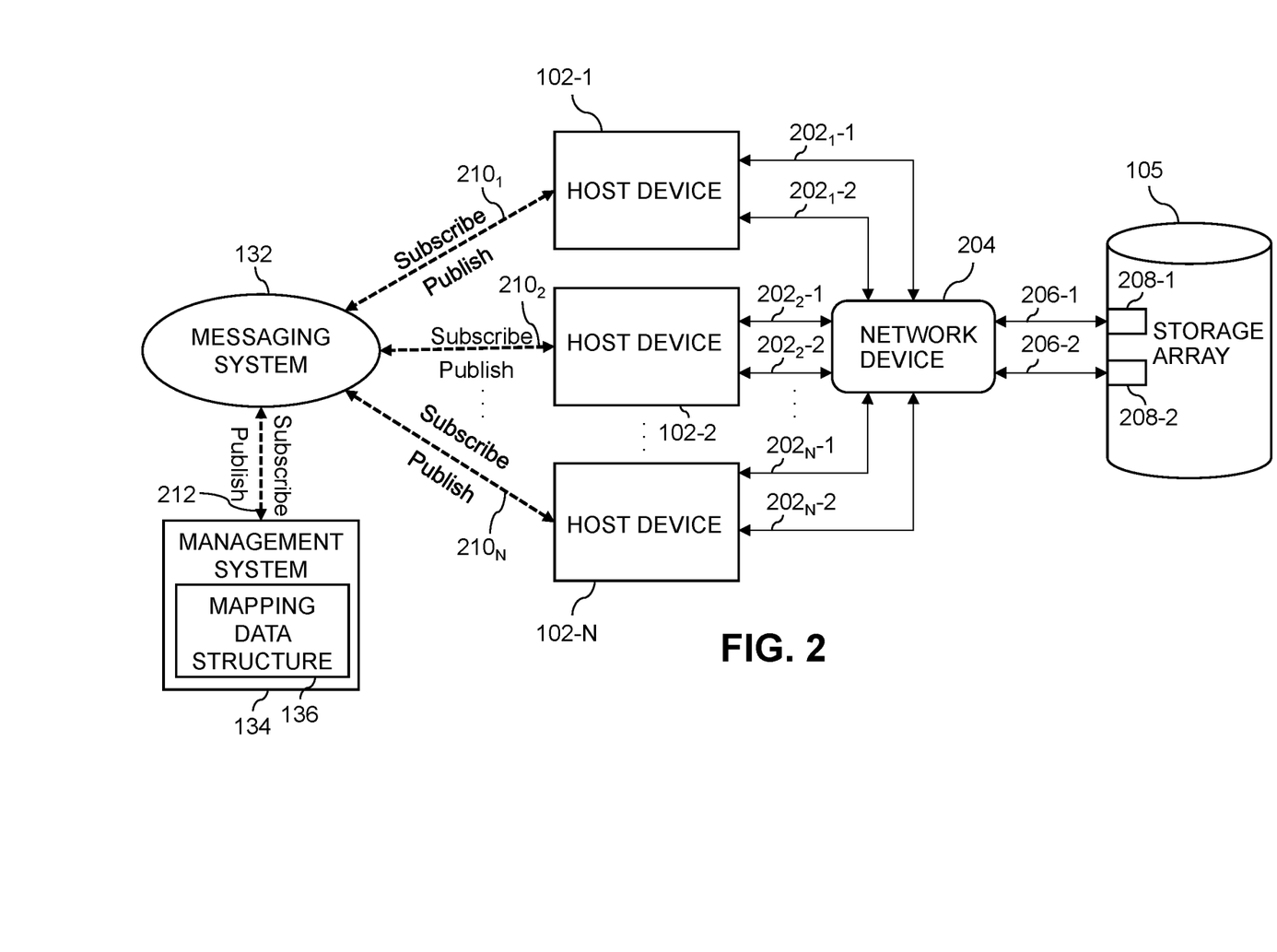
FIG. 2 is a block diagram illustrating an example implementation of the information processing system of FIG. 1 in an illustrative embodiment.

With reference now to FIG. 2, an example configuration of system 100 is illustrated. In FIG. 2, each of the host devices 102 communicates with the storage array 105 via a plurality of paths which utilize a combination of communication links 202, one or more network devices 204, e.g., a switch, communication links 206, and ports 208. While the example of FIG. 2 only illustrates a single switch, two ports, and a number of communication links, any other number of each of these components may also be present in the storage system and utilized to provide communications between the host devices 102 and the storage array 105.

In the illustrated example, host device 102-1 is connected to the network device 204 using communication links 2021-1 and 2021-2, host device 102-2 is connected to the network device 204 using communication links 2022-1 and 2022-2, and host device 102-N is connected to the network device 204 using communication links 202N-1 and 202N-2. Network device 204 is connected to port 208-1 of the storage array 105 using communication link 206-1 and is connected to port 208-2 of the storage array 105 using communication link 206-2. A given path between a host device and the storage array 105 utilizes one of the communication links 202, the network device 204, one of the communication links 206 and one of the corresponding connected ports 208. Although not illustrated in FIG. 2, each host device may also comprise an HBA connected to at least one of the communication links 202 which may be described as an initiator of a path. Each port 208 may likewise be described as a target of a path.

As an example, a first path between host device 102-1 and storage array 105 in the example of FIG. 2 may comprise communication link 2021-1, network device 204, communication link 206-1 and port 208-1. A second path between host device 102-1 and storage array 105 in the example of FIG. 2 may comprise communication link 2021-1, network device 204, communication link 206-2 and port 208-2. A third path between host device 102-1 and storage array 105 in the example of FIG. 2 may comprise communication link 2021-2, network device 204, communication link 206-1 and port 208-1. A fourth path between host device 102-1 and storage array 105 in the example of FIG. 2 may comprise communication link 2021-2, network device 204, communication link 206-2 and port 208-2. In this example, there are four available paths between host device 102-1 and storage array 105. Host devices 102-2, . . . 102-N may have available paths described in a similar manner. In other examples embodiments, where there are a smaller or larger number of communication links 202, network devices 204, communication links 206, or ports 208 between the host devices 102 and the storage array 105, a smaller or larger number of paths may alternatively be available.

As seen in FIG. 2, each of the host devices 102 may also communicate with messaging system 132. For example, as seen in FIG. 2, host device 102-1 may communicate with messaging system 132 using a communication link 2101, host device 102-2 may communicate with messaging system 132 using a communication link 2102, and host device 102-N may communicate with the messaging system 132 using a communication link 210N. Communication links 210 may be utilized by the host devices 102 to subscribe to the messaging system 132, to publish information to the messaging system 132, and to receive information from the messaging system 132 that was published by the other host devices 102 or by management system 134. In some embodiments, communication links 210 may be separate from SAN 104. In some embodiments, SAN 104 may comprise communication links 210.

As also seen in FIG. 2, a management system 134 may also communicate with messaging system 132. For example, as seen in FIG. 2, management system 134 may communicate with messaging system 132 using a communication link 212. Communication link 212 may be utilized by the management system 134 to subscribe to the messaging system 132, to publish information to the messaging system 132, and to receive information from the messaging system 132 that was published by the host devices 102. In some embodiments, communication link 212 may be separate from SAN 104. In some embodiments, SAN 104 may comprise the communication link 212. In some embodiments, communication link 212 may be internal to a host device 130 that hosts both the messaging system 132 and the management system 134. In some embodiments, messaging system 132 and management system 134 may reside on separate host devices or any other component of the information processing system. While not explicitly illustrated in FIG. 2, management system 132 may also be configured to communicate directly with the respective host devices 102 separate from messaging system 132 via the communication links 210 or via other communication links.

Sometimes, a host device installation template is used to configure numerous host devices 102 in an environment. For example, if an application is running on multiple host devices 102 and needs an allocation of a 100 gigabyte (GB) logical volume for use by a database application and an allocation of a 10 GB logical volume for use by a log application, the host device installation template may specify that a first pseudo name is to be used for multipath devices that comprise paths to the 100 GB logical volume allocated to the database application and a second pseudo name is to be used for multipath devices that comprise paths to the 10 GB logical volume allocated to the log application.

In a typical storage system, the pseudo names of the multipath devices are automatically configured by the MPIO drivers 112 of each host device 102. In such a storage system, the MPIO drivers of each host device 102 typically assign their own pseudo names to their multipath devices. For example, the multipath devices for the same logical volume of the information processing system may be assigned different pseudo names on different host devices 102 by their respective MPIO drivers 112.

In one example scenario, the MPIO driver 112-1 of a first host device 102-1 may assign the pseudo name deviceA to a multipath device for a given logical volume while the MPIO driver 112-2 of a second host device 102-2 may assign the pseudo name deviceB to a multipath device for the same given logical volume. For example, in such a scenario, the pseudo names on different host devices 102 for the multipath devices for the 100 GB logical volume allocated to the database application may be different.

In another example scenario, the MPIO driver 112-1 of the first host device 102-1 may assign the pseudo name deviceA to a multipath device for the given logical volume while the MPIO driver 112-2 of a second host device 102-2 may assign the pseudo name deviceA to a multipath device for another logical volume. For example, in such a scenario, the MPIO driver 112-1 of the first host device 102-1 may assign the pseudo name deviceA to the multipath device for the 100 GB logical volume allocated to the database application, while the MPIO driver 112-2 of the second host device 102-2 may assign the pseudo name deviceA to the multipath device for the 10 GB logical volume allocated to the log application. In such a scenario, the same pseudo name is being assigned by different host devices 102 to the multipath devices for different logical volumes. An application expecting a certain pseudo name to map to a certain logical volume may unintentionally attempt to utilize the wrong logical volume for its 10 operations in such an example scenario.

After the operating system is installed, a user, administrator or other operator will typically need to log in to each host device 102 and configure the pseudo name of the multipath devices for the logical volumes used by the database application and the log application to match the pseudo names in the host device installation template. Such a process may require significant usage of resources and may cause potential downtime or disruption of the involved host devices and logical volumes.

In illustrative embodiments, the messaging logic 114 is disclosed which is configured to automatically manage the logical volume to pseudo name mappings for multipath devices through the use of a central repository associated with the management system 134. The management system 134 may comprise a centralized management console through which host devices 102 can be monitored. The host devices 102 are configured to regularly send path and device information to the management system 134 once they are connected to it. This infrastructure may be leveraged to store the central repository and provide logical volume to pseudo name mapping information in response to queries from one or more of the host devices 102.

For example, the central repository may maintain a mapping data structure 136 (FIG. 2) comprising logical volume identifier to pseudo name mappings for some or all of the logical volumes in the storage system. In some embodiments, the logical volume identifier may comprise, for example, world wide names (WWNs) associated with the logical volumes. The mapping data structure 136 may be updated when new logical volumes are configured for a host device 102. For each logical volume, a pseudo name may be manually or automatically assigned in the mapping data structure 136. The messaging logic 114 of a host device 102 on which a given application is running is configured to query this mapping data structure 136 for each logical volume that it manages and to obtain the corresponding pseudo name. The messaging logic 114 then configures the pseudo name of the multipath device on that host device 102 for the logical volume according to the mapping data structure 136 instead of relying on the MPIO driver 112 to automatically generate the pseudo name.

Figure 3A:
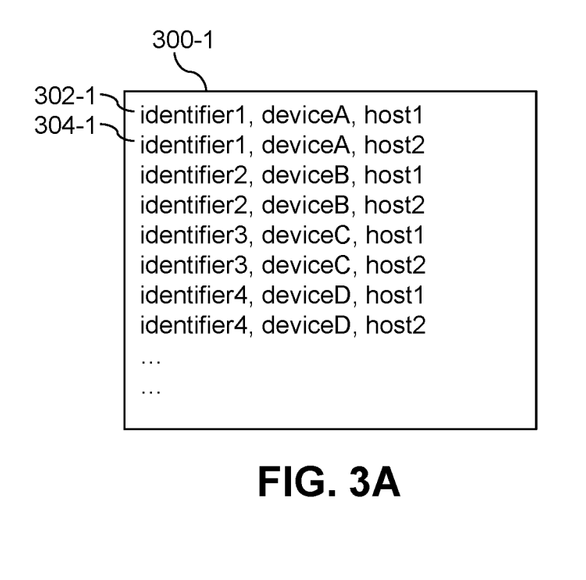
FIG. 3A is an illustration of an example format for a mapping data structure of a management system of the information processing system of FIG. 1 in an illustrative embodiment.
Figure 3B:
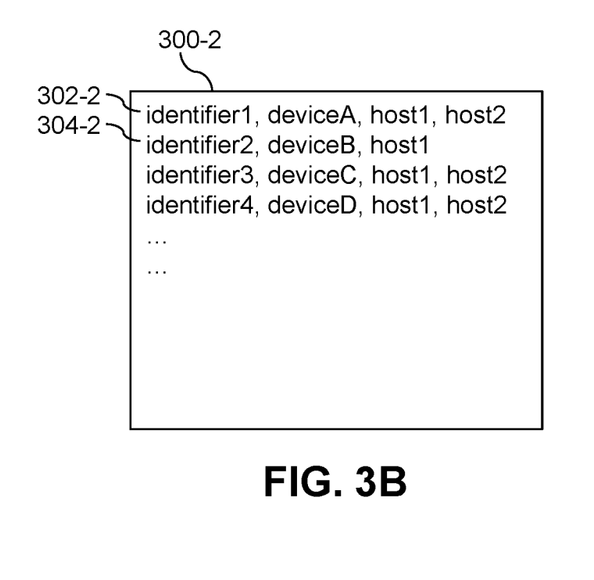
FIG. 3B is an illustration of another example format for a mapping data structure of a management system of the information processing system of FIG. 1 in an illustrative embodiment.

With reference to FIGS. 3A and 3B, example formats 300-1 and 300-2 for storing the logical volume identifier to pseudo name mapping in the mapping data structure 136 are illustrated. In example format 300-1, each entry in the mapping data structure 136 may comprise a triplet of a logical volume identifier, a pseudo name and a host device. For example, entry 302-1 may comprise a logical volume identifier "identifier1", a pseudo name "deviceA" and a host device "host1". Likewise, an entry 304-1 may comprise a logical volume identifier "identifier1", a pseudo name "deviceA" and a host device "host2". For example, as seen in the example format 300-1, each host device has a separate entry for each logical volume identifier to pseudo name mapping even where the same logical volume identifier is used.

In example format 300-2, each entry in the mapping data structure 136 may comprise a logical volume identifier, a pseudo name and one or more of host devices. For example, entry 302-2 may comprise a logical volume identifier "identifier1", a pseudo name "deviceA" and one or more host devices, e.g., "host1", "host2" in this example format. Likewise, an entry 304-2 may comprise a logical volume identifier "identifier2", a pseudo name "deviceB" and one or more host devices, e.g., only "host1" in this example format. The listed host devices in each entry may comprise each host device that has generated a multipath device for the logical volume corresponding to that logical volume identifier. As an example, a unique entry in example format 300-2 may be included for each logical volume identifier which includes the identification of the mapped pseudo name and corresponding host devices.

While formats 300-1 and 300-2 are provided as examples, any other format may be utilized to store the mappings of the logical volume identifiers to the corresponding pseudo names of the multipath devices.

Figure 4:
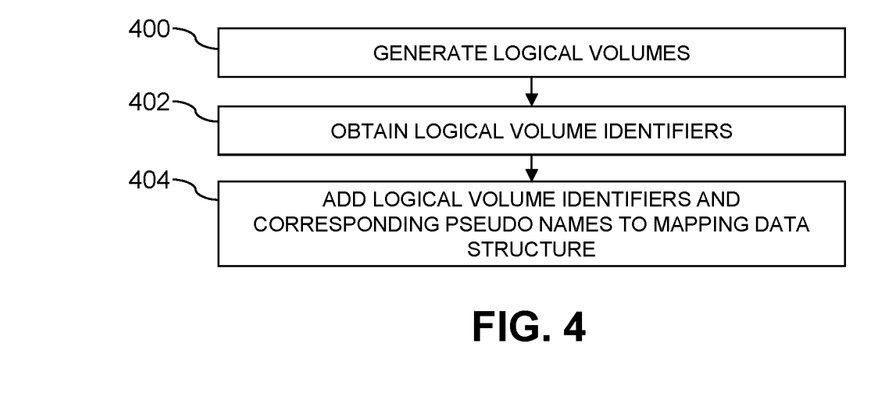
FIG. 4 is a flow diagram of an example process for automatically configuring pseudo names for logical volumes across host devices in an illustrative embodiment.

In some embodiments, in conjunction with the configuration of new logical volumes for a host device 102, the process as shown in FIG. 4 may be performed. The process of FIG. 4 includes steps 400 through 404, and is suitable for use in the system 100 but is more generally applicable to other types of systems comprising multiple host devices and a shared storage system.

While the example process of FIG. 4 is described below from the perspective of host device 102-1, any other host device may be configured to perform one or more of the steps of the process of FIG. 4. In an illustrative embodiment, the process of FIG. 4 is performed at least in part by a given host device 102 and at least in part by management system 134.

At step 400, one or more logical volumes are generated for use by a host device 102-1 and configured to the host device 102-1. For example, an application running on host device 102-1 indicates a need for one or more logical volumes of particular sizes. In the example mentioned above, the application needs a 100 GB logical volume for a database application and a 10 GB logical volume for a log application.

At step 402, messaging logic 114 obtains the logical volume identifiers, e.g., WWNs, for any generated logical volumes.

At step 404, messaging logic 114 adds these logical volume identifiers and the corresponding desired pseudo names, for example, as set forth in the host device installation template, to the mapping data structure 136 stored in the central repository of the management system 134, for example, in format 300 as described above. For example, messaging logic 114 may submit the logical volume identifiers and pseudo names to the management system 134 for addition to the mapping data structure 136 when the new logical volumes are initially allocated for used by the application.

Figure 5:
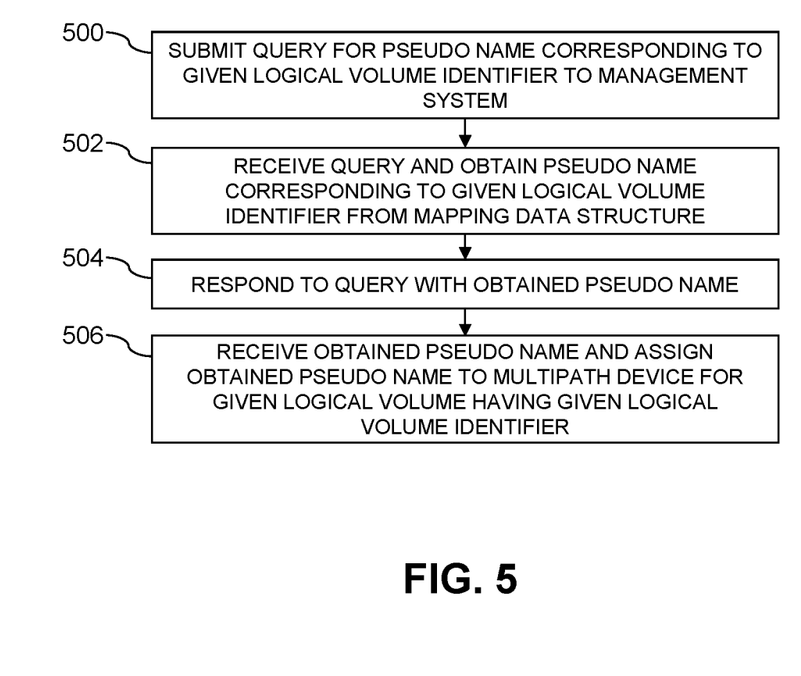
FIG. 5 is a flow diagram of another example process for automatically configuring pseudo names for logical volumes across host devices in an illustrative embodiment.

In some embodiments, in conjunction with the configuration of logical volumes on a host device 102 by an MPIO driver 112 to generate multipath devices, the process as shown in FIG. 5 may be performed by the messaging logic 114. The process of FIG. 5 includes steps 500 through 506, and is suitable for use in the system 100 but is more generally applicable to other types of systems comprising multiple host devices and a shared storage system. In an illustrative embodiment, the process of FIG. 5 is performed at least in part by a given host device and at least in part by management system 134.

At step 500, the messaging logic 114 of a given host device 102 submits a query, e.g., through a socket call, to the management system 134 to obtain the pseudo name from the mapping data structure 136 of the central repository that corresponds to a given logical volume identifier of a logical volume.

At step 502, the management system 134 obtains the pseudo name corresponding to the given logical volume identifier from the mapping data structure 136.

At step 504, the management system 134 responds the given host device 102 with the obtained pseudo name that corresponds to the given logical volume identifier.

At step 506, messaging logic 114 assigns the pseudo name received from the management system 134 to the multipath device for the given logical volume having the given logical volume identifier.

In an illustrative embodiment, messaging system 132 comprising a connectivity protocol such as, e.g., the MQ Telemetry Transport (MQTT), may be utilized to share the mapping information found in the mapping data structure 136 between the management system 134 and the host devices 102. For example, messaging system 132 may comprise a MQTT broker service. In some embodiments, messaging system 132 and management system 134 may run on a given host device 130. Messaging system 132 and management system 134 may alternatively run on separate host devices or on any other component of the system 100. In such an embodiment, the messaging logic 114 may be configured to query the management system 134 using the messaging system 132 before configuring a pseudo name of the multipath device comprising the paths for a logical volume. In an illustrative embodiment, the messaging logic 114 of each of the host devices 102 subscribes that host device 102 to a corresponding topic of the messaging system 132. For example, host device 102-1 may be subscribed to the /host1 topic, host device 102-2 may be subscribed to the /host2 topic, and so on. In addition, management system 134 may also be subscribed to a /get_mapping topic of the messaging system 132.

Figure 6:
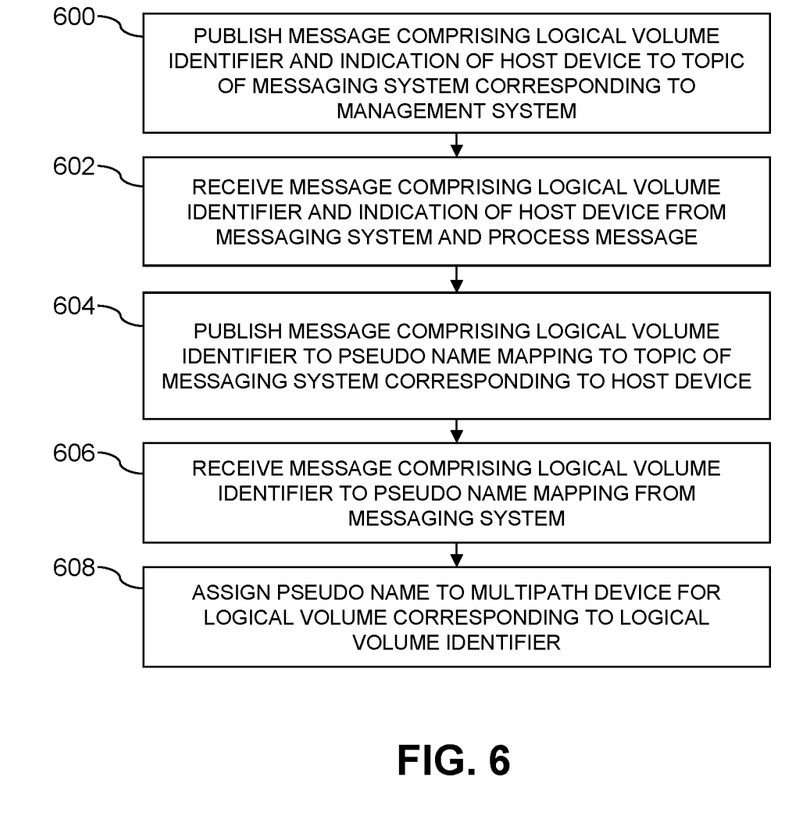
FIG. 6 is a flow diagram of a further example process for automatically configuring pseudo names for logical volumes across host devices in an illustrative embodiment.

In some embodiments, in conjunction with the configuration of logical volumes on a host device 102 by an MPIO driver 112 to generate multipath devices, the process as shown in FIG. 6 may be performed by the messaging logic 114. The process of FIG. 6 includes steps 600 through 608, and is suitable for use in the system 100 but is more generally applicable to other types of systems comprising multiple host devices and a shared storage system. In an illustrative embodiment, the process of FIG. 6 is performed at least in part by a given host device and at least in part by management system 134.

At step 600, the messaging logic 114-1 of a given host device 102-1 publishes a message to a topic in the messaging system 132 that corresponds to the management system 134, e.g., the /get_mapping topic of the messaging system 132 described above. The message may comprise a logical volume identifier, e.g., wwn1, for the target logical volume that is has to be configured and may comprise an indication, e.g., host1, of the host device that is publishing the message.

As an example, the message may comprise information in a JavaScript Object Notation (JSON) format such as, e.g., {wwn: "wwn1", host: "host1"}. Any other format may be used for the message.

At step 602, the management system 134, which is subscribed to the /get_mapping topic, receives the message comprising the logical volume identifier and the indication of the host device from the messaging system 132 and processes it. For example, the management system 134 may query the mapping data structure 136 to determine if the wwn1 is present in the mapping data structure 136 in response to receiving the message from the messaging system 132.

At step 604, the management system 134 publishes a message to the /host1 topic which comprises the logical volume identifier and a corresponding pseudo name from the mapping data structure 136. For example, the message to the /host1 topic may comprise information in a JSON format such as, e.g., {wwn: "wwn1", pseudo_name: "deviceA"}. Any other format may be used for the message.

At step 606, the messaging logic 114 of the host device 102-1, which is subscribed to the /host1 topic, receives the message comprising the logical volume identifier to pseudo name mapping information from the messaging system 132.

At step 608, messaging logic 114 assigns the pseudo name from the received message to the multipath device for the given logical volume having the given logical volume identifier, e.g., deviceA.

In some cases, the mapping data structure 136 may not comprise a pseudo name mapping for a given logical volume identifier. For example, if the given logical volume is newly created in the storage system and was not previously in use, there may not be a mapping between the logical volume identifier for that given logical volume and a corresponding pseudo name in the mapping data structure 136. In such a case, the MPIO driver 112 of the host device 102 may automatically assign a pseudo name to the multipath device comprising the paths to that logical volume as described above in the typical storage system. The automatically assigned pseudo name may then be submitted to the management system 134 by messaging logic 114 and used to update the mapping data structure 136 with the new pseudo device to logical volume identifier mapping information, e.g., by generating a new entry for that logical volume identifier. For example, where the messaging system 132 is utilized, the management system 134 may be subscribed to an /add mapping topic. The host device 102 may publish a message to the /add mapping topic with a format such as, e.g., {wwn: "wwn1", pseudo_name: "deviceA", host: "host1"}, to add a pseudo name mapping for the logical volume identifier. Any other format may be used for the message.

In another case, the management system 134 or mapping data structure 136 may not be available to be queried, for example, due to connectivity issues in the SAN 104 (FIG. 1) or other links 210 (FIG. 2), a failure of the management system 134, or other similar issues. In such a case, the host devices 102 may be configured to temporarily or permanently store the mapping information locally and then either update the mapping information to the mapping data structure 136 when it becomes available, if there was no mapping entry for that logical volume identifier, or update the local mapping according to the mapping information found in the mapping data structure 136 if the logical volume identifier already had a corresponding entry in the mapping data structure 136, as needed.

In the above described manner, the multipath devices corresponding to a given logical volume on one or more host devices 102 may be configured to have the same pseudo name.

Separate instances of the processes of FIGS. 4-6 may be performed in respective additional host devices that share the storage array.

The particular processing operations and other system functionality described in conjunction with the flow diagrams of FIGS. 4-6 are presented by way of illustrative example only, and should not be construed as limiting the scope of the disclosure in any way. Alternative embodiments can use other types of processing operations involving host devices, storage systems and messaging logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different messaging logic arrangements within a given information processing system.

Functionality such as that described in conjunction with the flow diagrams of FIGS. 4-6 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for automatically configuring pseudo names for logical volumes across host devices are carried out at least in part under the control of its messaging logic 114. For example, messaging logic 114 is illustratively configured to control performance of portions of the process shown in the flow diagrams described above in conjunction with FIGS. 4-6.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select 10 operations from a corresponding one of the sets of IO queues 110 for delivery to the storage array 105 over the SAN 104, and to perform the disclosed functionality for automatically configuring pseudo names for logical volumes across host devices. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support automatic configuration of pseudo names for logical volumes across host devices.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for automatically configuring pseudo names for logical volumes across host devices as disclosed herein, the pseudo names of the multipath devices on multiple host devices that comprise paths for a given logical volume will require manual modification to include the pseudo name defined in a host device installation template.

Such drawbacks are advantageously overcome in illustrative embodiments herein by utilization of messaging logic 114 to implement functionality for automatically configuring pseudo names for logical volumes across host devices as described above. For example, by allowing a storage system to create and store logical volume to pseudo name mapping information in a centralized location such as a central repository mapping data structure, that information may be utilized to configure the same pseudo name on all of the host devices for the multipath devices comprising paths to a given logical volume. In addition, the disclosed functionality for automatically configuring pseudo names for logical volumes across host devices eliminates or reduces the need for storing logical volume to pseudo name mapping information locally on the host devices. The disclosed functionality for automatically configuring pseudo names for logical volumes across host devices also allows for the recovery of the logical volume to pseudo name mappings in the event of host device corruption in an easy and efficient manner utilizing the mapping information found in the central repository mapping data structure.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the messaging logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, messaging logic and messaging systems. Also, the particular configurations of system and device elements and associated processing operations illustratively shown in the drawings can be varied in other embodiments. For example, a wide variety of different MPIO driver configurations and associated messaging logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising at least one processor coupled to memory, the host device being configured to communicate over a network with a storage system comprising a plurality of storage devices, the host device being further configured:
to identify a logical volume identifier corresponding to a given logical volume of the storage system;
to submit a message comprising an indication of the logical volume identifier to a messaging system;
to obtain, from the messaging system, an indication of a pseudo name corresponding to the logical volume identifier; and
to assign the obtained pseudo name to a multipath device corresponding to the given logical volume, the multipath device comprising a plurality of paths between the host device and the given logical volume.

2. The apparatus of claim 1 wherein the apparatus further comprises:
a second host device comprising at least one processor coupled to memory, the second host device configured to communicate over the network with the storage system, the second host device being configured:
to identify the logical volume identifier corresponding to the given logical volume of the storage system;
to submit a second message comprising an indication of the logical volume identifier to the messaging system;
to obtain, from the messaging system, an indication of the pseudo name corresponding to the logical volume identifier; and
to assign the obtained pseudo name to a second multipath device corresponding to the given logical volume, the second multipath device comprising a second plurality of paths between the second host device and the given logical volume.

3. The apparatus of claim 1 wherein:
the messaging system comprises a subscription-based messaging system; and
the host device is further configured to subscribe to the messaging system.

4. The apparatus of claim 3 wherein:
the messaging system comprises a plurality of topics; and
the host device being configured to subscribe to the messaging system comprises the host device being configured to subscribe to a topic of the plurality of topics that corresponds to the host device.

5. The apparatus of claim 4 wherein submitting the message to the messaging system comprises publishing the message to a given topic of the plurality of topics that corresponds to a management system, the management system being subscribed to the given topic and configured to obtain the published message from the messaging system based at least in part on the subscription to the given topic.

6. The apparatus of claim 5 wherein:
the management system comprises a mapping data structure, the mapping data structure comprising a plurality of entries, a given entry of the plurality of entries corresponding to the logical volume identifier and comprising the pseudo name corresponding to the logical volume identifier; and
the management system is configured to obtain the pseudo name from the given entry based at least in part on the indication of the logical volume identifier found in the obtained published message.

7. The apparatus of claim 6 wherein:
the message comprises an indication of the host device; and
the management system is further configured to publish a response to the topic of the plurality of topics that corresponds to the host device based at least in part on the indication of the host device included in the message, the response comprising an indication of the pseudo name corresponding to the logical volume identifier obtained from the given entry in the mapping data structure.

8. The apparatus of claim 5 wherein the host device is further configured:
to identify a second logical volume identifier corresponding to a second logical volume of the storage system;
to publish a message comprising a second indication of the second logical volume identifier to the given topic of the plurality of topics of the messaging system that corresponds to the management system;
to obtain, from the management system via the messaging system, an indication that a pseudo name corresponding to the second logical volume identifier does not yet exist in the management system;
to assign a second pseudo name to a multipath device corresponding to the second logical volume, the multipath device corresponding to the second logical volume comprising a plurality of paths between the host device and the second logical volume; and
to publish a third message comprising the second indication of the second logical volume identifier and an indication of the second pseudo name to a topic of the messaging system to which the management system is subscribed.

9. A method comprising:
identifying, by a host device comprising at least one processor coupled to memory, a logical volume identifier corresponding to a given logical volume of a storage system;
submitting, by the host device, a message comprising an indication of the logical volume identifier to a messaging system;
obtaining, by the host device, from the messaging system, an indication of a pseudo name corresponding to the logical volume identifier; and
assigning, by the host device, the obtained pseudo name to a multipath device corresponding to the given logical volume, the multipath device comprising a plurality of paths between the host device and the given logical volume.

10. The method of claim 9 wherein the method further comprises:
identifying, by a second host device comprising at least one processor coupled to memory, the logical volume identifier corresponding to the given logical volume of a storage system;
submitting, by the second host device, a second message comprising an indication of the logical volume identifier to the messaging system;
obtaining, by the second host device, from the messaging system, an indication of the pseudo name corresponding to the logical volume identifier; and
assigning, by the second host device, the obtained pseudo name to a second multipath device corresponding to the given logical volume, the second multipath device comprising a plurality of paths between the second host device and the given logical volume.

11. The method of claim 9 wherein:
the messaging system comprises a subscription-based messaging system; and
the method further comprises subscribing, by the host device, to the messaging system.

12. The method of claim 11 wherein:
the messaging system comprises a plurality of topics; and
subscribing to the messaging system comprises subscribing to a topic of the plurality of topics that corresponds to the host device.

13. The method of claim 12 wherein submitting the message to the messaging system comprises publishing the message to a given topic of the plurality of topics that corresponds to a management system, the management system being subscribed to the given topic and configured to obtain the published message from the messaging system based at least in part on the subscription to the given topic.

14. The method of claim 13 wherein:
the management system comprises a mapping data structure, the mapping data structure comprising a plurality of entries, a given entry of the plurality of entries corresponding to the logical volume identifier and comprising the pseudo name corresponding to the logical volume identifier; and
the management system is configured to obtain the pseudo name from the given entry based at least in part on the indication of the logical volume identifier found in the obtained published message.

15. The method of claim 14 wherein:
the message comprises an indication of the host device; and
the management system is further configured to publish a response to the topic of the plurality of topics that corresponds to the host device based at least in part on the indication of the host device included in the message, the response comprising an indication of the pseudo name corresponding to the logical volume identifier obtained from the given entry in the mapping data structure.

16. The method of claim 13 wherein the method further comprises:
identifying a second logical volume identifier corresponding to a second logical volume of the storage system;
publishing a message comprising a second indication of the second logical volume identifier to the given topic of the plurality of topics of the messaging system that corresponds to the management system;
obtaining, from the management system via the messaging system, an indication that a pseudo name corresponding to the second logical volume identifier does not yet exist in the management system;
assigning a second pseudo name to a multipath device corresponding to the second logical volume, the multipath device corresponding to the second logical volume comprising a plurality of paths between the host device and the second logical volume; and
publishing a third message comprising the second indication of the second logical volume identifier and an indication of the second pseudo name to a topic of the messaging system to which the management system is subscribed.

17. A computer program product comprising a non-transitory processor-readable storage medium having stored therein program code of one or more software programs, wherein the program code, when executed by a host device that is configured to communicate over a network with a storage system comprising a plurality of storage devices, causes the host device:
to identify a logical volume identifier corresponding to a given logical volume of the storage system;
to submit a message comprising an indication of the logical volume identifier to a messaging system;
to obtain, from the messaging system, an indication of a pseudo name corresponding to the logical volume identifier; and
to assign the obtained pseudo name to a multipath device corresponding to the given logical volume, the multipath device comprising a plurality of paths between the host device and the given logical volume.

18. The computer program product of claim 17 wherein the program code, when executed by a second host device that is configured to communicate over a network with the storage system, causes the second host device:
- to identify the logical volume identifier corresponding to the given logical volume of the storage system;
- to submit a second message comprising an indication of the logical volume identifier to the messaging system;
- to obtain, from the messaging system, an indication of the pseudo name corresponding to the logical volume identifier; and
- to assign the obtained pseudo name to a second multipath device corresponding to the given logical volume, the second multipath device comprising a second plurality of paths between the second host device and the given logical volume.

19. The computer program product of claim 17 wherein:
the messaging system comprises a subscription-based messaging system comprising a plurality of topics;
the program code further causes the host device to subscribe to a topic of the plurality of topics that corresponds to the host device;
wherein submitting the message to the messaging system comprises publishing the message to a given topic of the plurality of topics that corresponds to a management system, the management system being subscribed to the given topic and configured to obtain the published message from the messaging system based at least in part on the subscription to the given topic.

20. The computer program product of claim 19 wherein:
the management system comprises a mapping data structure, the mapping data structure comprising a plurality of entries, a given entry of the plurality of entries corresponding to the logical volume identifier and comprising the pseudo name corresponding to the logical volume identifier;
the management system is configured to obtain the pseudo name from the given entry based at least in part on the indication of the logical volume identifier found in the obtained published message;
the message comprises an indication of the host device; and
the management system is further configured to publish a response to the topic of the plurality of topics that corresponds to the host device based at least in part on the indication of the host device included in the message, the response comprising an indication of the pseudo name corresponding to the logical volume identifier obtained from the given entry in the mapping data structure.

* * * * *